United States Patent
Hirai et al.

(10) Patent No.: US 9,395,692 B2
(45) Date of Patent: Jul. 19, 2016

(54) HAIRSPRING MATERIAL FOR MECHANICAL TIMEPIECE AND HAIRSPRING USING THE SAME

(71) Applicants: CITIZEN HOLDINGS CO., LTD., Nishitokyo-shi, Tokyo (JP); CITIZEN WATCH CO., LTD., Nishitokyo-shi, Tokyo (JP); HITACHI METALS, LTD., Minato-ku, Tokyo (JP); NEOMAX MATERIALS CO., LTD., Suita-shi, Osaka (JP)

(72) Inventors: Yoshirou Hirai, Sayama (JP); Shinichi Matsumoto, Tokorozawa (JP); Kenji Tsuchiya, Higashikurume (JP); Shinji Yamamoto, Suita (JP)

(73) Assignees: CITIZEN HOLDINGS CO., LTD., Tokyo (JP); CITIZEN WATCH CO., LTD., Tokyo (JP); HITACHI METALS, LTD., Tokyo (JP); HITACHI METALS NEOMATERIAL, LTD., Osaka (JP)

( * ) Notice: Subject to any disclaimer, the term of this patent is extended or adjusted under 35 U.S.C. 154(b) by 0 days.

(21) Appl. No.: 14/421,233

(22) PCT Filed: Aug. 29, 2013

(86) PCT No.: PCT/JP2013/073114
§ 371 (c)(1),
(2) Date: Feb. 12, 2015

(87) PCT Pub. No.: WO2014/034766
PCT Pub. Date: Mar. 6, 2014

(65) Prior Publication Data
US 2015/0241847 A1    Aug. 27, 2015

(30) Foreign Application Priority Data

Aug. 31, 2012 (JP) ................. 2012-192547

(51) Int. Cl.
*G04B 17/06* (2006.01)
*C21D 9/02* (2006.01)
(Continued)

(52) U.S. Cl.
CPC *G04B 17/06* (2013.01); *C21D 9/02* (2013.01); *C22C 38/00* (2013.01); *C22C 38/002* (2013.01); *C22C 38/02* (2013.01); *C22C 38/06* (2013.01); *C22C 38/50* (2013.01); *F16F 1/10* (2013.01)

(58) Field of Classification Search
CPC ................. G04B 17/06; G04B 1/145
See application file for complete search history.

(56) References Cited

U.S. PATENT DOCUMENTS

| 2,072,489 A | 3/1937 | Straumann |
| 2,419,825 A | 4/1947 | Dinerstein |

(Continued)

FOREIGN PATENT DOCUMENTS

| CN | 86106519 A | 6/1987 |
| DE | 3617685 A1 | 12/1987 |

(Continued)

OTHER PUBLICATIONS

International Search Report of PCT/JP2013/073114, dated Oct. 29, 2013. [PCT/ISA/210].

(Continued)

*Primary Examiner* — Amy Cohen Johnson
*Assistant Examiner* — Jason Collins
(74) *Attorney, Agent, or Firm* — Sughrue Mion, PLLC

(57) ABSTRACT

A hairspring material for a mechanical timepiece includes an alloy which contains 37.5 to 39.5% by mass of Ni, 9.2 to 9.9% by mass of Cr, 0.35 to 0.55% by mass of Ti, and 0.6 to 0.9% by mass of Be, based on the total amount of the alloy, and contains in the remainder Fe and unavoidable impurities, the alloy being an alloy containing, as the unavoidable impurities, C (carbon), Mn in an amount of more than 0% by mass but not more than 0.5% by mass and Al in an amount of more than 0% by mass but less than 0.03% by mass, the amount of the C (carbon) being limited to not more than 0.03% by mass. The hairspring material can provide a smaller variation in Young's modulus than that of conventional hairspring materials.

9 Claims, 2 Drawing Sheets

(51) Int. Cl.
*C22C 38/00* (2006.01)
*C22C 38/50* (2006.01)
*F16F 1/10* (2006.01)
*C22C 38/02* (2006.01)
*C22C 38/06* (2006.01)

(56) References Cited

U.S. PATENT DOCUMENTS

| | | | |
|---|---|---|---|
| 2,466,285 A | | 4/1949 | Straumann |
| 2,859,149 A | * | 11/1958 | Straumann ............... C21D 9/02 148/326 |
| 3,918,924 A | * | 11/1975 | Shibata ..................... C22C 1/10 419/15 |
| 3,928,085 A | * | 12/1975 | Yamamura ............. G04B 1/145 148/419 |
| 5,881,026 A | | 3/1999 | Baur et al. |
| 2007/0133355 A1 | | 6/2007 | Hara et al. |
| 2011/0286312 A1 | | 11/2011 | Murakami et al. |

FOREIGN PATENT DOCUMENTS

| | | |
|---|---|---|
| GB | 495562 A | 11/1938 |
| GB | 588390 A | 5/1947 |
| GB | 578559 A | 7/1947 |
| JP | 49-134512 A | 12/1974 |
| JP | 11-71625 A | 3/1999 |
| JP | 2005-140674 A | 6/2005 |
| JP | 2010-138491 A | 6/2010 |

OTHER PUBLICATIONS

Communication dated May 19, 2016 from the European Patent Office in counterpart application No. 13832473.6.

* cited by examiner

HAIRSPRING MATERIAL FOR MECHANICAL TIMEPIECE AND HAIRSPRING USING THE SAME

CROSS REFERENCE TO RELATED APPLICATIONS

This application is a National Stage of International Application No. PCT/JP2013/073114 filed Aug. 29, 2013 (claiming priority based on Japanese Patent Application No. 2012-192547, filed Aug. 31, 2012), the contents of which are incorporated by reference in their entirety.

TECHNICAL FIELD

The present invention relates to a hairspring material for a mechanical timepiece and a hairspring obtained from the hairspring material.

BACKGROUND ART

As shown in FIG. 1, a speed governor 1 of a mechanical timepiece is generally composed of an escape wheel 10, an anchor striker 20 and a balance 30. To the balance 30, a hairspring 40 that is a thin plate spring in the form of a spiral having a plural winding number is fixed. Specifically, the inner end of the hairspring 40 is fixed to a collet mounted on a balance staff that is a center shaft of the balance 30, and the outer end of the hairspring 40 is fixed to a stud 42. In the mechanical timepiece, by the action of this hairspring 40, repetitive movement transmitted from the anchor striker 20 is converted to a constant period of regular oscillation, whereby the rotation of the balance 30 can be controlled.

As a material of such a hairspring, a constant elastic alloy having an elinvar effect that the change of Young's modulus with temperature is extremely small, such as an alloy wherein Ti has been added to a Fe—Ni—Cr alloy, is known (see patent literature 1). Specifically, a hairspring material composed of an alloy consisting of 40.0 to 44.5% by weight of Ni, 4.50 to 6.50% by weight of Cr, 1.50 to 3.50% by weight of Ti, not more than 0.80% by weight of Al, not more than 2.50% by weight of total of C, Mn, Si, S and P, and a remainder that is Fe is described in the patent literature 1.

The alloy disclosed in this patent literature 1 is slightly distorted by magnetostriction due to self magnetization, and a change that the interatomic distance is decreased by reduction of magnetization with temperature increase and a change that the interatomic distance is increased by thermal expansion are compensated each other. On this account, the change of Young's modulus with temperature in a given temperature region (not higher than Curie temperature) becomes extremely small. The temperature coefficient of Young's modulus is a value obtained by quantifying a change of Young's modules with temperature increase, and it indicates a quantity of change of Young's modulus per ° C.

The present inventors have used in the past a hairspring material composed of an alloy which is different from the alloy disclosed in the patent literature 1 in chemical components and which contains 37.5 to 39.5% by mass of Ni, 9.2 to 9.9% by mass of Cr, 0.35 to 0.55% by mass of Ti, 0.6 to 0.9% by mass of Be and 0.06 to 0.12% by mass of C (carbon), based on the total amount, and contains a remainder of Fe and unavoidable impurities, said alloy being an alloy containing, as the unavoidable impurities, not more than 0.5% by mass of Mn and less than 0.03% by mass of Al. After the final solution treatment, cold drawing, cold rolling and aging treatment have been appropriately applied to this material, whereby a hairspring having not only proper strength and Young's modulus but also proper temperature coefficient of Young's modulus has been produced. When the temperature coefficient of Young's modulus of a hairspring is controlled to a proper range, there is an advantage that a variation in moment of inertia of a balance wheel caused by temperature change can be corrected.

The hairspring material having been used by the present inventors has an extremely small change of Young's modulus with temperature, but a variation in Young's modulus of a hairspring obtained from this material is sometimes observed, so that there is yet room for improvement.

CITATION LIST

Patent Literature

Patent literature 1: Japanese Patent Laid-Open Publication No. 1974-134512

SUMMARY OF INVENTION

Technical Problem

Accordingly, it is an object of the present invention to provide a hairspring material for a mechanical timepiece, which has an elinvar effect and can reduce a variation in Young's modulus of a hairspring at, for example, ordinary temperature.

Solution to Problem

The present inventors have found that the above problem can be solved by a hairspring material having specific composition, and they have achieved the present invention. That is to say, the hairspring material for a mechanical timepiece of the present invention is characterized by comprising an alloy which contains 37.5 to 39.5% by mass of Ni, 9.2 to 9.9% by mass of Cr, 0.35 to 0.55% by mass of Ti and 0.6 to 0.9% by mass of Be, based on the total amount of the alloy, and contains a remainder including Fe and unavoidable impurities, said alloy being an alloy containing, as the unavoidable impurities, C (carbon), not more than 0.5% by mass of Mn and less than 0.03% by mass of Al, the amount of said C (carbon) being limited to not more than 0.03% bymass. Preferable is a hairspring material for a mechanical timepiece, comprising an alloy in which the amount of C (carbon) of the unavoidable impurities is limited to not more than 0.01% by mass. From the above hairspring material for a timepiece of the present invention, a hairspring can be obtained.

Advantageous Effects of Invention

According to the hairspring material for a mechanical timepiece of the present invention, a hairspring having a small variation in Young's modulus (hairspring a variation in Young's modulus of which is limited to, for example, 0 to 2.44 GPa) can be produced. If a hairspring produced from the material is used, a tendency of rate gain in short arc, which is very advantageous for a timepiece, is obtained. Further, in the production of a hairspring from the above hairspring material, a life of a die used for cold drawing can be improved.

DESCRIPTION OF EMBODIMENTS

Figure 1:
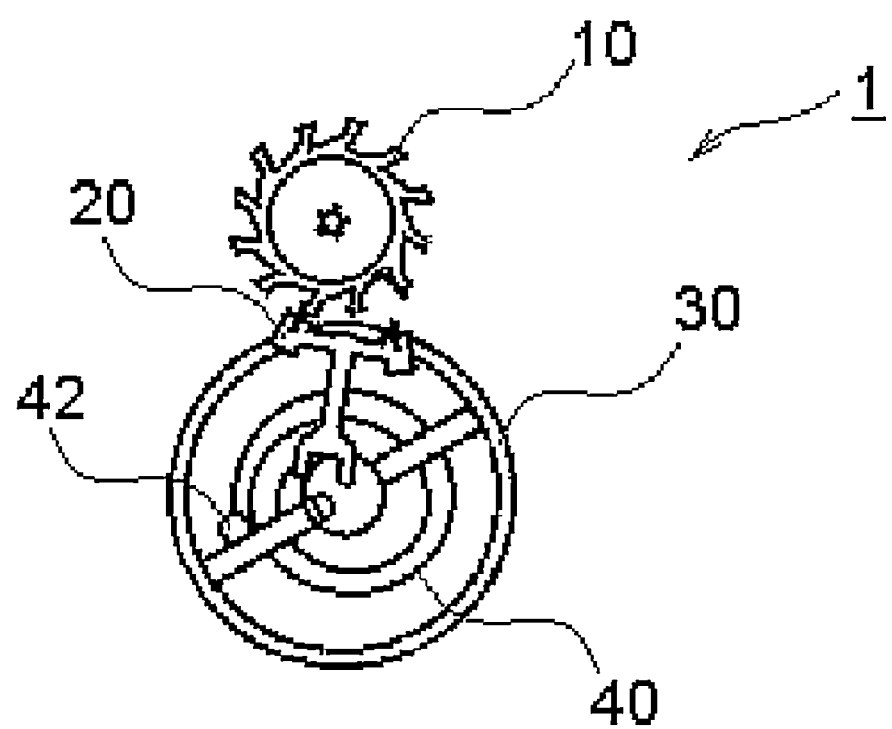
FIG. 1 is a view for explaining a hairspring of a mechanical timepiece.

The present invention is described in detail hereinafter.

<Hairspring Material for Mechanical Timepiece and Hairspring Obtained from the Material>

The hairspring material for a mechanical timepiece of the present invention is a constant elastic material having an elinvar effect of Fe—Ni—Cr system, and comprises an alloy containing 37.5 to 39.5% by mass of Ni, 9.2 to 9.9% by mass of Cr, 0.35 to 0.55% by mass of Ti and 0.6 to 0.9% by mass of Be, based on the total amount of the alloy, and containing a remainder including Fe and unavoidable impurities, said alloy being an alloy containing, as the unavoidable impurities, C (carbon), not more than 0.5% by mass of Mn and less than 0.03% by mass of Al, the amount of said C (carbon) being limited to not more than 0.03% by mass. The hairspring of the present invention is obtained from the above hairspring material.

Ni and Cr are main constituents for allowing the material to exhibit constant elasticity together with Fe.

Based on the total amount of the alloy, Ni is contained in an amount of 37.5 to 39.5% by mass, and Cr is contained in an amount of 9.2 to 9.9% by mass. When the amounts of Ni and Cr are in these ranges, the alloy is more preferable from the viewpoints of solid solution strengthening and precipitation hardening, and from the alloy, a hairspring material having excellent mechanical strength can be obtained. Moreover, mechanical strength of a hairspring obtained by the use of this material can be improved.

Ti and Be are components contained in slight amounts as compared with the aforesaid Ni and Cr, but by appropriately using them, constant elasticity and hardness can be further improved.

Ti sometimes forms a compound together with another element and is thought to contribute to improvement in hardness.

Ti is contained in an amount of 0.35 to 0.55% by mass based on the total amount of the alloy. When the amount of Ti is in this range, the alloy is more preferable from the viewpoints of solid solution strengthening and precipitation hardening and from the viewpoint that the change of Young's modulus of the resulting hairspring with temperature becomes smaller.

Be is contained in an amount of 0.6 to 0.9% by mass based on the total amount of the alloy. When the amount of Be is in this range, the alloy is more preferable from the viewpoints of solid solution strengthening and precipitation hardening and from the viewpoint that the change of Young's modulus of the resulting hairspring with temperature becomes smaller.

In the alloy, the remainder includes Fe and unavoidable impurities. Fe is an element that is a base occupying the remainder other than the above components. On this account, the amounts of the unavoidable impurities in the remainder are preferably as small as possible. However, the unavoidable impurities may be contained in such amounts that mechanical strength necessary for a hairspring is not deteriorated.

Examples of the unavoidable impurities include Mn, Al and C (carbon). As a case where Mn, Al and/or C (carbon) is contained in the material of the present invention, there can be mentioned a case where three kinds of them are all contained or a case where one or two kinds of these three kinds are contained.

In the material of the present invention, the amount of Mn that is an unavoidable impurity is not more than 0.5% by mass based on the total amount of the alloy. In other words, the amount of Mn is limited to more than 0% by mass but not more than 0.5% by mass based on the total amount of the alloy, or Mn is not contained at all. In the present specification, the expression "An element is not contained at all" means that the amount thereof is not more than the limit of detection in the analysis of composition in the later-described working examples. Mn is sometimes added as a deoxidizer in the refining of an alloy, and in the resulting alloy, Mn having been not removed from a molten metal in the deoxidation treatment can mainly remain unintentionally, or in some cases, Mn is contained in a raw material, and this Mn unavoidably exists also in the material of the present invention unintentionally. It is thought that even if Mn is contained, mechanical strength necessary for a hairspring material can be obtained by limiting its amount to the above amount.

In the material of the present invention, the amount of Al that is an unavoidable impurity is less than 0.03% by mass (preferably less than 0.02% by mass) based on the total amount of the alloy. In other words, the amount of Al is limited to more than 0% by mass but less than 0.03% by mass (preferably less than 0.02% by mass) based on the total amount of the alloy, or Al is not contained at all. Al is sometimes added as a deoxidizer in the refining of an alloy similarly to Mn, and in the resulting alloy, Al having been not removed from a molten metal in the deoxidation treatment can mainly remain unintentionally, or in some cases, Al is contained in a raw material, and this Al unavoidably exists also in the material of the present invention unintentionally. It is thought that even if Al is contained, mechanical strength necessary for a hairspring material can be obtained by limiting its amount to the above amount.

It is particularly important that the amount of C (carbon) that is an unavoidable impurity in the material of the present invention is limited to not more than 0.03% by mass based on the total amount of the alloy. In other words, it is important that the amount of C (carbon) is limited to more than 0% by mass but not more than than 0.03% by mass based on the total amount of the alloy, or C (carbon) is not contained at all. The amount of C (carbon) is limited to this range, or no C (carbon) is allowed to be contained, whereby a hairspring material capable of reducing the variation in Young's modulus of a hairspring to such an extent as has not been observed in the past can be obtained. The reason why the variation in Young's module can be reduced as above will be described later in detail. C (carbon) is sometimes added for deoxidation in the refining of an alloy, and in the resulting alloy, C (carbon) having been not removed from a molten metal in the deoxidation treatment may mainly form a carbide such as TiC and can remain unintentionally, or in some cases, C (carbon) is contained in a raw material, and this C (carbon) unavoidably exists also in the material of the present invention unintentionally. Even if C (carbon) is contained, not only can mechanical strength necessary for a hairspring material be obtained but also a hairspring material capable of reducing the variation in Young's modulus of a hairspring to such an extent as has not been observed in the past can be obtained, by limiting its amount to the above amount. In the present invention, C is not used as a deoxidizer, or even if it is used, the amount thereof is not more than 0.03% by mass. It is desirable that deoxidation is carried out by the use of Al and Mn.

It is more preferable to limit the amount of C (carbon) that is an unavoidable impurity to not more than 0.01% by mass based on the total amount of the alloy, and not only can the variation in Young's modulus of the hairspring material be reduced but also the Young's modulus thereof can be made larger. The reason why the Young's modulus can be made larger as above will be described later in detail.

The amounts of elements other than Mn, Al and C (carbon) are as follows. It is preferable that the total amount of elements that are derived from raw materials and are liable to be introduced, such as V, is limited to not more than 0.05% by mass. It is preferable that the total amount of elements that are liable to be introduced in the refining of an ally and to remain, such as O and N, is limited to not more than 0.01% by mass. These elements are impurities that are liable to be unavoidably introduced in the material of the present invention unintentionally, but it is thought that by limiting their amounts to the above ranges, no influence is exerted on various properties required for a hairspring material, such as mechanical strength.

In the alloy to constitute the hairspring material of the present invention, a part of the above elements added, such as Ni, Cr, Ti and Be, sometimes exist as inclusions. Examples of the inclusions include TiC, BeO, TiN, CrC and NiC.

Here, a relationship between limiting of the amount of C (carbon) to the above range or containing of no C (carbon) and reduction of a variation in Young's modulus of the hairspring material is further described together with details of achievement of the present invention.

If a hairspring material having been used in the past by the present inventors, namely, a hairspring material comprising an alloy which contains 37.5 to 39.5% by mass of Ni, 9.2 to 9.9% by mass of Cr, 0.35 to 0.55% by mass of Ti, 0.6 to 0.9% by mass of Be and 0.06 to 0.12% by mass of C (carbon), based on the total amount of the alloy, and contains a remainder of Fe and unavoidable impurities, said alloy being an alloy containing, as the unavoidable impurities, not more than 0.5% by mass of Mn and less than 0.03% by mass of Al, is used, the aforesaid variation in Young's modulus is sometimes observed in the hairspring produced.

As can be seen from the following formula (1), if there is a variation in Young's modulus, the thickness, the width or the length of the hairspring needs to be altered according to the Young's modulus of the hairspring material in order to produce a timepiece having a given frequency. If it is not altered, the frequency varies to the contrary to thereby exert serious influence on the performance of timepiece.

[Math. 1]

$$T = \frac{1}{f} = 2\pi\sqrt{\frac{12IL}{Ebt^3}} = 2\pi\sqrt{\frac{12mr^2L}{Ebt^3}} \quad (1)$$

(T: frequency, I: moment of inertia of balance wheel, L: length of hairspring, b: width of hairspring, t: thickness of hairspring, E: Young's modulus)

The present inventors have found that microcracks present in the hairspring material for forming the hairspring are related to a variation in the Young's modulus. That is to say, the present inventors have found that if the amounts or the sizes of the microcracks vary, a variation in the Young's modulus occurs. Further, they have also found that with increase of the number of microcracks, the Young's modulus is lowered.

Since a method to reduce the microcracks has not been hitherto known, the present inventors have first attempted to remove microcracks having been formed in the cold drawing, by abrading a wire. However, an abrasion mark remains not in the longitudinal direction of the wire but in the vertical direction (in the direction of the circumference with which the abrasive wheel comes into contact), and even if a post treatment is carried out, this mark cannot be removed. Next, the present inventors have attempted strong acid cleaning after the final solution treatment. After the final solution treatment, strong acid cleaning was carried out to such an extent that the diameter of the wire is decreased by 15 μm, and as a result, the number of microcracks is decreased, but there is yet room for improvement in limiting of a variation in Young's modulus for stabilization of Young's modulus.

Then, the present inventors have studied composition of a hairspring material in detail. In the case of the composition of the hairspring material used by the present inventors, an inclusion of TiC having a size of 5 to 10 μm is formed in the material prior to hot forging. This Tic hardly undergoes plastic deformation even when the material is subjected to cold drawing and cold rolling after the final solution treatment, and therefore, it is presumed that this inclusion becomes a nucleus and forms a microcrack. Then, the present inventors have perceived limiting of the amount of C (carbon) to the aforesaid range, which is an important characteristic of the present invention as previously described. By virtue of this, an effect that the amount or the size of the inclusion TiC formed is reduced to inhibit occurrence of microcracks is obtained, and stabilization of Young's modulus of a hairspring material and limitation of a variation thereof are made possible. It has been found that when the amount of C (carbon) is limited to not more than 0.03% by mass, the size of the Tic tends to be limited to not more than 5 μm, and when the amount of C (carbon) is limited to not more than 0.01% by mass, the size of the Tic tends to be limited to not more than 3 μm.

As described above, when the hairspring material for a mechanical timepiece of the present invention is used, a hairspring not only having a proper Young's modulus and a proper temperature coefficient thereof but also exhibiting a small variation in Young's modulus can be produced. In the conventional hairspring materials, C (carbon) is used for solid solution strengthening or deoxidation in many cases. In the present invention, however, C (carbon) is one of unavoidable impurities, and by limiting the amount of C (carbon) to the above range in order to control formation of TiC as described above, various properties preferable for not only the hairspring material but also a hairspring produced by the use of this material, such as mechanical strength, can be obtained.

Further, when a hairspring produced from the hairspring material for a mechanical timepiece of the present invention is used, a tendency of rate gain in short arc, which is very advantageous for a timepiece, is obtained. Furthermore, in the production of a hairspring using the hairspring material of the present invention, a life of a die used for cold drawing can be improved. It is thought this is because an amount of TiC, which is a hard inclusion, has been reduced in the hairspring material.

<Preparation Process for Hairspring Material for Mechanical Timepiece and Production Process for Hairspring>

The hairspring material for a mechanical timepiece of the present invention is obtained as an ingot by controlling the amounts of the components so as to be in the aforesaid ranges to thereby appropriately form a blend and melting the blend in a vacuum melting furnace. The raw materials are blended so that Fe may become a base and the content of each element of Ni, Cr, Ti and Be may be in the above range in the resulting alloy, to form a blend, and in the formation of this blend, Mn, Al and C (carbon) are not added intentionally. If the amounts of them can be limited to the above ranges in the resulting alloy, they may be added, but in the present invention, they are elements which should be treated as impurities persistently.

The hairspring of the present invention is obtained from the hairspring material of the present invention. Specifically, the hairspring material of the present invention is subjected to hot forging, and then subjected to solution treatment, pickling and cold drawing repeatedly. After the final cold drawing, the thus-treated material is subjected to cold rolling, then formed into a desired spiral shape and thereafter subjected to aging treatment for giving a hairspring of a spiral shape (spiral reforming aging treatment). Thus, a hairspring can be finally produced.

The aging treatment is preferably carried out at not lower than 560° C. From the viewpoint of a temperature coefficient of Young's modulus, the aging treatment is more preferably carried out at not lower than 580° C., still more preferably 580 to 640° C.

The present invention is more specifically described with reference to the following examples, but it should be construed that the present invention is in no way limited to those examples.

EXAMPLES

<Preparation of Hairspring>

Example 1

A blend was formed by controlling the amounts of components so that the composition of the blend might become that of Example 1 shown in Table 1, and the blend was melted in a vacuum induction furnace to prepare an ingot. This ingot was subjected to hot forging treatment at 800 to 1200° C. to form a rod having a diameter of 20 mm. Subsequently, solution treatment, pickling and cold drawing were repeated. The solution treatment was carried out at 800 to 1200° C. for 30 to 120 minutes. After the final cold drawing, cold rolling was carried out, and aging treatment for giving a hairspring of a spiral shape (spiral reforming aging treatment) was carried out. The aging treatment was carried out at 560° C. for 120 to 180 minutes. Thus, a hairspring was obtained. The thickness and the width of the hairspring were 32 μm and 100 μm, respectively.

Example 2

A hairspring was obtained in the same manner as in Example 1, except that the temperature of the aging treatment was changed to 580° C.

Example 3

A hairspring was obtained in the same manner as in Example 1, except that the temperature of the aging treatment was changed to 600° C.

Example 4

A hairspring was obtained in the same manner as in Example 1, except that a blend was formed by controlling the amounts of the components so that the composition of the blend might become that of Example 4 shown in Table 2.

Example 5

A hairspring was obtained in the same manner as in Example 4, except that the temperature of the aging treatment was changed to 580° C.

Example 6

A hairspring was obtained in the same manner as in Example 4, except that the temperature of the aging treatment was changed to 600° C.

Example 7

A hairspring was obtained in the same manner as in Example 1, except that a blend was formed by controlling the amounts of the components so that the composition of the blend might become that of Example 7 shown in Table 3.

Example 8

A hairspring was obtained in the same manner as in Example 7, except that the temperature of the aging treatment was changed to 580° C.

Example 9

A hairspring was obtained in the same manner as in Example 7, except that the temperature of the aging treatment was changed to 600° C.

Example 10

A hairspring was obtained in the same manner as in Example 7, except that the temperature of the aging treatment was changed to 620° C.

Example 11

A hairspring was obtained in the same manner as in Example 7, except that the temperature of the aging treatment was changed to 640° C.

Comparative Example 1

A hairspring was obtained in the same manner as in Example 1, except that a blend was formed by controlling the amounts of the components so that the composition of the blend might become that of Comparative Example 1 shown in Table 4.

Comparative Example 2

A hairspring was obtained in the same manner as in Comparative Example 1, except that the temperature of the aging treatment was changed to 580° C.

Comparative Example 3

A hairspring was obtained in the same manner as in Comparative Example 1, except that the temperature of the aging treatment was changed to 600° C.

<Evaluation Methods for Hairspring Material and Hairspring, and Evaluation Results>

1. Composition

Composition was analyzed by the use of XRF, ICP, etc. Specifically, from the ingot obtained by melting the blend in a vacuum induction furnace, a specimen in a small amount was cut, and it was used as a sample for analysis. The results are set forth in Tables 1 to 4.

2. Tensile Strength, Elongation

Using a fine wire having a diameter of 0.8 mm, which had been taken out from a material during the course of the working process, said wire having been given prior to the final cold drawing (after solution treatment), tensile strength and elongation were measured in accordance with JIS Z 2241. As each of the tensile strength and the elongation, a mean of measured values of two samples was determined. The results are set forth in Tables 1 to 4.

3. Composition and Size of Inclusion

From a wire having a diameter of 9 mm, which had been taken out from a material during the course of the working process, a sectional sample was prepared, and compositions and sizes of inclusions in the sample were analyzed by EPMA. A sectional photograph of the sample prepared was introduced into a computer as electronic data, and sizes (lengths) of inclusions were all measured by the use of image processing technology. Observation was carried out under the conditions of 400 magnifications and a field number of 60. The region of 1.0653 mm$^2$ was observed. The results are set forth in Tables 1 to 4.

4. Young's Modulus, Temperature Coefficient of Young's Modulus, Variation in Young's Modulus Young's modulus was determined in the following manner. By the use of a cantilevered Young's modulus measuring instrument, a sample was oscillated by electrostatic driving to detect natural oscillation, and from the results, Young's modulus was calculated. Temperature coefficient of Young's modulus was calculated using Young's moduli at 25° C. and 55° C. Specifically, the temperature coefficient was determined by the formula (Young's modulus at 55° C.–Young's modulus at 25° C.)/30. In the case of a general temperature coefficient of Young's modulus, this calculated value needs to be further divided by the Young's modulus at 25° C., but in the working examples of the present specification, the above calculated value is used as a temperature coefficient of Young's modulus for convenience.

The sample for each evaluation item had a size of a thickness of 32 μm and a width of 100 μm which were the same as those of the hairspring and a length of 30 mm. With regard to each evaluation item, a mean of measured values of three samples was determined in Examples 2 and 5, and a mean of measured values of four samples was determined in Example 8 and Comparative Example 2. With regard to the hairsprings of Example 8 and Comparative Example 2, standard deviation of measured values of Young's moduli of four samples (these Young's moduli were values measured at 25° C.) was determined as a variation in Young's modulus. The results are set forth in Tables 1 to 4.

5. Hardness

Hardness of a sample having been subjected to rolling finish and aging treatment was measured by a micro-Vickers hardness meter. The sample had a size of a thickness of 32 μm and a width of 100 μm which were the same as those of the hairspring and a length of 30 mm. As the hardness, a mean of measured values of three samples was determined. The results are set forth in Table 1 to 4.

From the above evaluation results, the following can be seen. In Examples 1 to 11, by decreasing the amount of C (carbon) added, the sizes of the inclusions could be made smaller than those of the conventional products (Comparative Examples 1 to 3). On the other hand, when reforming aging treatment of 580° C. for forming a spiral shape necessary for a hairspring was carried out, Young's modulus, temperature coefficient and hardness of the hairsprings of Examples 2, 5 and 8 were values satisfactory for hairsprings. However, Examples 7 to 9 in which the amount of C (carbon) added was smaller than that in Examples 1 to 6 had higher Young's moduli than Examples 1 to 6, and they were superior to Examples 1 to 6 as hairsprings.

6. SEM Observation

With regard to Comparative Example 2 and Example 8, SEM observation was carried out. A hairspring having been subjected to reforming aging treatment to form a spiral shape was compressed to become in an overlapped state in the thickness direction so that the spiral might seem to have no gaps, and this hairspring was used as an observation sample. The side of the hairspring where the laminated spiral could be seen was magnified 1000 times and observed.

Figure 2:
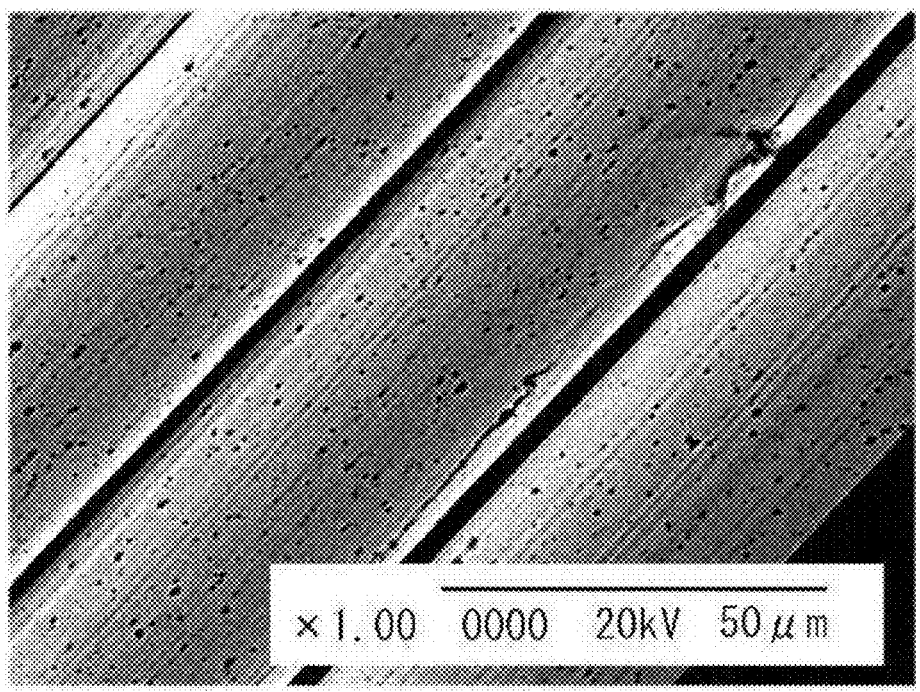
FIG. 2 is a view showing results of evaluation of a hairspring of Comparative Example 2.
Figure 3:
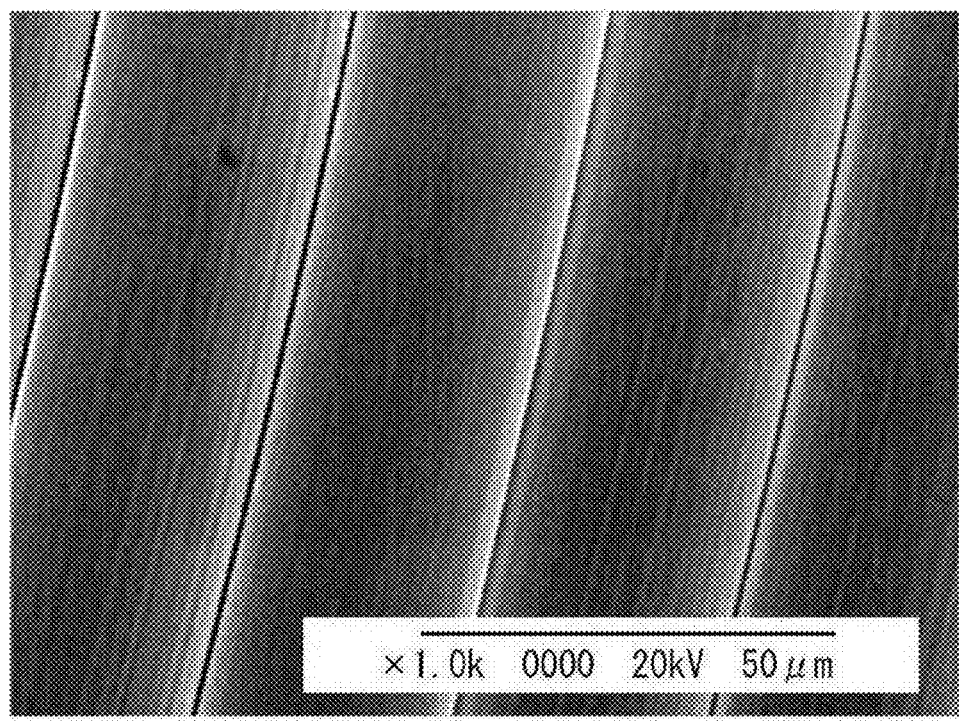
FIG. 3 is a view showing results of evaluation of a hairspring of Example 8.

A SEM photograph of the hairspring of Comparative Example 2 is shown in FIG. 2, and a SEM photograph of the hairspring of Example 8 is shown in FIG. 3. In the hairspring of Comparative Example 2, a microcrack was obviously observed, but in the hairspring of Example 8, no obvious microcrack was observed and the surface of the hairspring was smooth. It is thought that occurrence of the microcrack corresponds to reduction of the size and the amount of the inclusion formed.

7. Isochronous Property

With regard to Comparative Example 2 and Example 8, evaluation of isochronous property was carried out. Specifically, the hairsprings of Comparative Example 2 (number of samples: 99) and Example 8 (number of samples: 100) were incorporated into timepieces, and the rate in an attitude on the face given when the spring was completely wound up and the rate in an attitude on the face given when 24 hours passed after the spring was completely wound up were measured to confirm isochronous property. The rate was measured by a rate measuring instrument.

The calculation method for isochronous property is as follows. It can be said that a larger value indicates a higher tendency of "rate gain in short arc".

Isochronous property=(rate given when 24 hours passed after spring was completely wound up)–(rate given when spring was completely wound up)

The results are set forth in Table 5.

The mean value of isochronous property in Example 8 was –4.0 sec/day, and when it was compared with –6.4 sec/day of the mean value of isochronous property in Comparative Example 2, it can be said that Example 8 had a tendency of "rate gain in short arc". The tendency of "rate gain in short arc" is a tendency that the rate of timepiece increases when the amplitude value of a "balance wheel" that is a constituent part of a speed governor is reduced or a tendency that the rate thereof decreases but the decrease is relatively small, and such a tendency is favorable for the performance of timepiece.

8. Life of Die

With regard to Comparative Example 2 and Example 8, a life of a die used in the cold drawing step was measured. As the die, a diamond die was used, and cold drawing was carried out to reduce the diameter to 0.090 mm from 0.2 mm.

When the hairspring material of Comparative Example 2 having a material weight of 600 g was subjected to the above cold drawing, the dye was damaged, but even when the hairspring material of Example 8 having a material weight of up to 2000 g was subjected to the above cold drawing, the die was not damaged. In other words, in the production of the hairspring of Example 8, a life of the die was improved to 3 times as compared with that in the production of the hairspring of Comparative Example 2. It is thought that this improvement in the life of the die corresponds to reduction of the sizes of extremely hard inclusions (particularly TiC) and the amounts of the inclusions formed.

TABLE 1

|  |  | Ex. 1 | Ex. 2 | Ex. 3 |
|---|---|---|---|---|
| Composition (% by mass) | Ni | 38.98 | 38.98 | 38.98 |
|  | Cr | 9.56 | 9.56 | 9.56 |
|  | C | 0.030 | 0.030 | 0.030 |
|  | Ti | 0.45 | 0.45 | 0.45 |
|  | Be | 0.64 | 0.64 | 0.64 |
|  | Mn | 0.31 | 0.31 | 0.31 |
|  | Al | 0.027 | 0.027 | 0.027 |
|  | Nb | — | — | — |
|  | Mg | — | — | — |
|  | O (ppm) | 8 | 8 | 8 |
| Tensile strength (N/mm$^2$) |  | 402 | 402 | 402 |
| Elongation (%) |  | 32.9 | 32.9 | 32.9 |
| Inclusion | Composition | TiC BeO TiN NiC | TiC BeO TiN NiC | TiC BeO TiN NiC |
|  | Size (μm) | 2-5 | 2-5 | 2-5 |

|  | Young's modulus (GPa) | Temperature coefficient (GPa/°C.) | Hardness (Hv) | Young's modulus (GPa) | Temperature coefficient (GPa/°C.) | Hardness (Hv) | Young's modulus (GPa) | Temperature coefficient (GPa/°C.) | Hardness (Hv) |
|---|---|---|---|---|---|---|---|---|---|
| Rolled finish |  |  | 394 |  |  | 394 |  |  | 394 |
| After aging treatment | 186 | 0.005 | 391 | 182 | 0.012 | 391 | 183 | 0.001 | 334 |

TABLE 2

|  |  | Ex. 4 | Ex. 5 | Ex. 6 |
|---|---|---|---|---|
| Composition (% by mass) | Ni | 38.90 | 38.90 | 38.90 |
|  | Cr | 9.58 | 9.58 | 9.58 |
|  | C | 0.020 | 0.020 | 0.020 |
|  | Ti | 0.43 | 0.43 | 0.43 |
|  | Be | 0.62 | 0.62 | 0.62 |
|  | Mn | 0.31 | 0.31 | 0.31 |
|  | Al | 0.017 | 0.017 | 0.017 |
|  | Nb | — | — | — |
|  | Mg | — | — | — |
|  | O (ppm) | 16 | 16 | 16 |
| Tensile strength (N/mm$^2$) |  | 373 | 373 | 373 |
| Elongation (%) |  | 34.2 | 34.2 | 34.2 |
| Inclusion | Composition | TiC BeO TiN NiC | TiC BeO TiN NiC | TiC BeO TiN NiC |
|  | Size (μm) | 2-5 | 2-5 | 2-5 |

|  | Young's modulus (GPa) | Temperature coefficient (GPa/°C.) | Hardness (Hv) | Young's modulus (GPa) | Temperature coefficient (GPa/°C.) | Hardness (Hv) | Young's modulus (GPa) | Temperature coefficient (GPa/°C.) | Hardness (Hv) |
|---|---|---|---|---|---|---|---|---|---|
| Rolled finish |  |  | 379 |  |  | 379 |  |  | 379 |
| After aging treatment | 184 | −0.003 | 386 | 182 | 0.009 | 361 | 183 | 0 | 330 |

TABLE 3

|  |  | Ex. 7 | Ex. 8 | Ex. 9 |
|---|---|---|---|---|
| Composition (% by mass) | Ni | 39.38 | 39.38 | 39.38 |
|  | Cr | 9.59 | 9.59 | 9.59 |
|  | C | 0.010 | 0.010 | 0.010 |
|  | Ti | 0.45 | 0.45 | 0.45 |
|  | Be | 0.63 | 0.63 | 0.63 |
|  | Mn | 0.31 | 0.31 | 0.31 |
|  | Al | 0.015 | 0.015 | 0.015 |
|  | Nb | — | — | — |
|  | Mg | — | — | — |
|  | O (ppm) | 21 | 21 | 21 |
| Tensile strength (N/mm$^2$) |  | 381 | 381 | 381 |

TABLE 3-continued

|  |  |  |  |  |
|---|---|---|---|---|
| Elongation (%) |  | 32.8 | 32.8 | 32.8 |
| Inclusion | Composition | TiC<br>BeO<br>TiN<br>NiC | TiC<br>BeO<br>TiN<br>NiC | TiC<br>BeO<br>TiN<br>NiC |
|  | Size (μm) | 1-3 | 1-3 | 1-3 |

|  | Young's modulus (GPa) | Temperature coefficient (GPa/° C.) | Hardness (Hv) | Young's modulus (GPa) | Temperature coefficient (GPa/° C.) | Hardness (Hv) | Young's modulus (GPa) | Temperature coefficient (GPa/° C.) | Hardness (Hv) |
|---|---|---|---|---|---|---|---|---|---|
| Rolled finish |  |  | 394 |  |  | 394 |  |  | 394 |
| After aging treatment | 190 | 0 | 399 | 188 | 0.006 | 373 | 188 | 0.004 | 334 |
| Variation in Young's modulus (GPa) |  |  |  |  | 2.44 |  |  |  |  |

|  |  |  | Ex. 10 | Ex. 11 |
|---|---|---|---|---|
| Composition (% by mass) | Ni |  | 39.38 | 39.38 |
|  | Cr |  | 9.59 | 9.59 |
|  | C |  | 0.010 | 0.010 |
|  | Ti |  | 0.45 | 0.45 |
|  | Be |  | 0.63 | 0.63 |
|  | Mn |  | 0.31 | 0.31 |
|  | Al |  | 0.015 | 0.015 |
|  | Nb |  | — | — |
|  | Mg |  | — | — |
|  | O (ppm) |  | 21 | 21 |
| Tensile strength (N/mm$^2$) |  |  | 381 | 381 |
| Elongation (%) |  |  | 32.8 | 32.8 |
| Inclusion | Composition |  | TiC<br>BeO<br>TiN<br>NiC | TiC<br>BeO<br>TiN<br>NiC |
|  | Size (μm) |  | 1-3 | 1-3 |

|  | Young's modulus (GPa) | Temperature coefficient (GPa/° C.) | Hardness (Hv) | Young's modulus (GPa) | Temperature coefficient (GPa/° C.) | Hardness (Hv) |
|---|---|---|---|---|---|---|
| Rolled finish |  |  | 394 |  |  | 394 |
| After aging treatment |  |  | 302 |  |  | 286 |
| Variation in Young's modulus (GPa) |  |  |  |  |  |  |

TABLE 4

|  |  | Comp. Ex. 1 | Comp. Ex. 2 | Comp. Ex. 3 |
|---|---|---|---|---|
| Composition (% by mass) | Ni | 39.10 | 39.10 | 39.10 |
|  | Cr | 9.53 | 9.53 | 9.53 |
|  | C | 0.070 | 0.070 | 0.070 |
|  | Ti | 0.49 | 0.49 | 0.49 |
|  | Be | 0.65 | 0.65 | 0.65 |
|  | Mn | 0.31 | 0.31 | 0.31 |
|  | Al | 0.025 | 0.025 | 0.025 |
|  | Nb | — | — | — |
|  | Mg | — | — | — |
|  | O (ppm) | 7 | 7 | 7 |
| Tensile strength (N/mm$^2$) |  | 399 | 399 | 399 |
| Elongation (%) |  | 32.2 | 32.2 | 32.2 |
| Inclusion | Composition | TiC<br>BeO<br>TiN<br>NiC | TiC<br>BeO<br>TiN<br>NiC | TiC<br>BeO<br>TiN<br>NiC |
|  | Size (μm) | 5-10 | 5-10 | 5-10 |

|  | Young's modulus (GPa) | Temperature coefficient (GPa/° C.) | Hardness (Hv) | Young's modulus (GPa) | Temperature coefficient (GPa/° C.) | Hardness (Hv) | Young's modulus (GPa) | Temperature coefficient (GPa/° C.) | Hardness (Hv) |
|---|---|---|---|---|---|---|---|---|---|
| Rolled finish |  |  | 397 |  |  | 397 |  |  | 397 |
| After aging treatment | 185 | 0.006 | 404 | 183 | 0.009 | 374 | 184 | 0.002 | 329 |
| Variation in Young's modulus (GPa) |  |  |  |  | 3.16 |  |  |  |  |

TABLE 5

| | Isochronous property | |
|---|---|---|
| | Ex. 8 | Comp. Ex. 2 |
| Mean value | −4.0 sec/day | −6.4 sec/day |
| Test results of difference in population mean | It can be said that in the case of a significance level of 0.1%, Example 8 has isochronous property of rate gain in short arc rather than Comparative Example 2. | |

Number of samples Ex. 8: 99, Comp. Ex. 2: 100

REFERENCE SIGNS LIST

1: speed governor
10: escape wheel
20: anchor striker
30: balance
40: hairspring
42: stud

The invention claimed is:

1. A hairspring material for a mechanical timepiece, comprising an alloy which contains 37.5 to 39.5% by mass of Ni, 9.2 to 9.9% by mass of Cr, 0.35 to 0.55% by mass of Ti and 0.6 to 0.9% by mass of Be, based on the total amount of the alloy, and contains a remainder comprising Fe and unavoidable impurities, said alloy being an alloy containing, as the unavoidable impurities, C (carbon), Mn in an amount of more than 0% by mass but not more than 0.5% by mass and Al in an amount of more than 0% by mass but less than 0.03% by mass, the amount of said C (carbon) being limited to not more than 0.03% by mass, wherein Ti and C are contained as TiC and the size of the TiC is not more than 5 μm.

2. The hairspring material for a mechanical timepiece as claimed in claim 1, which comprises an alloy wherein the amount of C (carbon) of the unavoidable impurities is limited to not more than 0.01% by mass.

3. The hairspring material for a mechanical timepiece as claimed in claim 2, wherein Ti and C are contained as TiC and the size of the TiC is not more than 3 μm.

4. A hairspring obtained from the hairspring material for a mechanical timepiece as claimed in claim 3.

5. A mechanical timepiece comprising the hairspring as claimed in claim 4.

6. A hairspring obtained from the hairspring material for a mechanical timepiece as claimed in claim 2.

7. A mechanical timepiece comprising the hairspring as claimed in claim 6.

8. A hairspring obtained from the hairspring material for a mechanical timepiece as claimed in claim 1.

9. A mechanical timepiece comprising the hairspring as claimed in claim 8.

* * * * *